(No Model.)
D. YOUNG.
GRAIN SEPARATOR.
No. 341,121. Patented May 4, 1886.
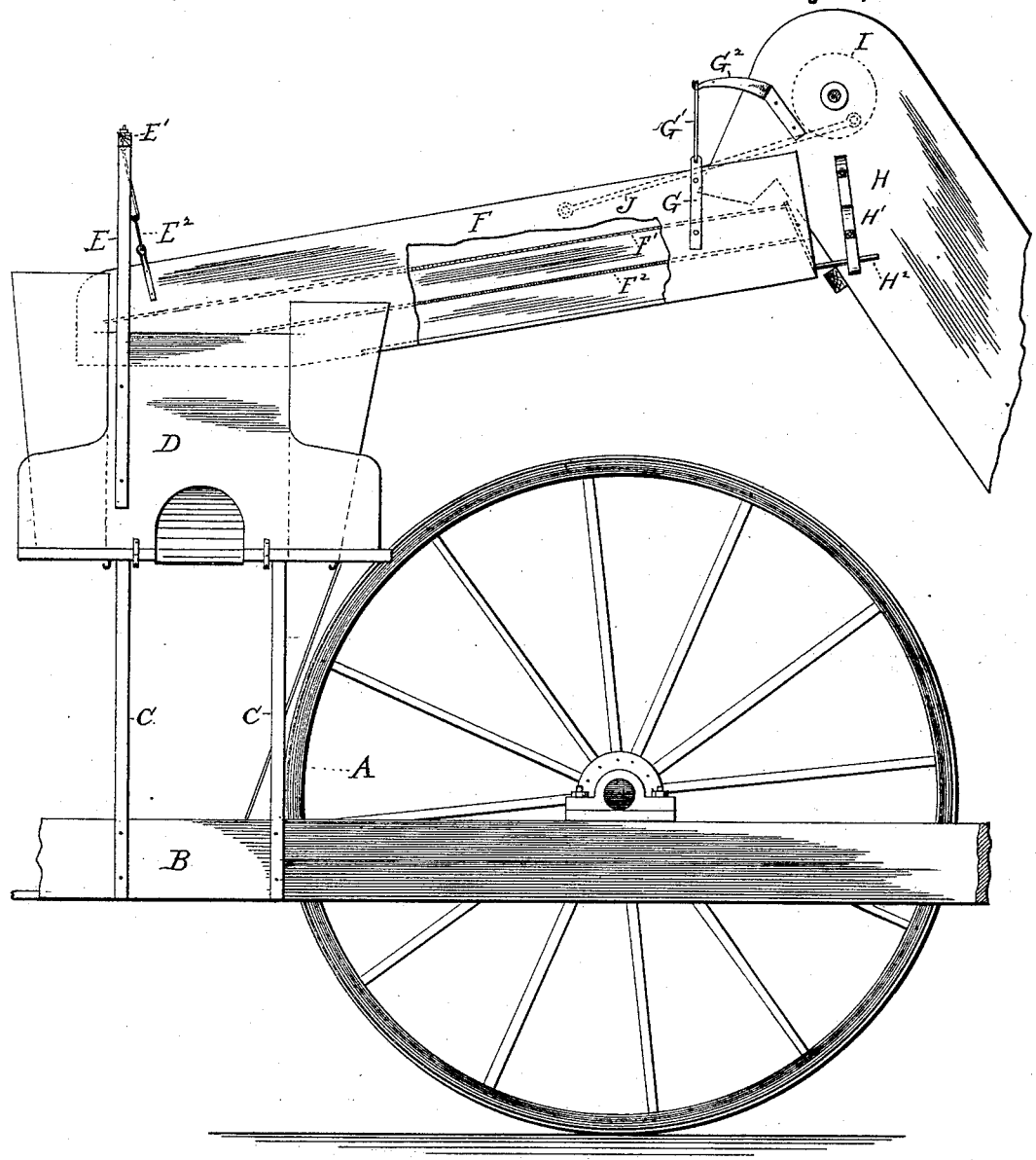
Witnesses:
Elihu D. Stowe.
Alfred B. Treadwell
Inventor.
David Young
By Joshua B. Webster Atty.

UNITED STATES PATENT OFFICE.

DAVID YOUNG, OF STOCKTON, CALIFORNIA.

GRAIN-SEPARATOR.

SPECIFICATION forming part of Letters Patent No. 341,121, dated May 4, 1886.

Application filed October 26, 1885. Serial No. 180,952. (No model.)

*To all whom it may concern:*

Be it known that I, DAVID YOUNG, a citizen of the United States, residing at Stockton, in the county of San Joaquin and State of California, have invented a certain new and useful Improvement in Grain-Separators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a class of grain-cleaners which separate the kernels of grain from all refuse and foul matter after such kernels have passed through a thrasher. It is preferably used upon combined headers and thrashers—a class of machines by which the grain is cut, thrashed, cleaned, sacked, and delivered on the ground.

It consists of the parts and combination of devices hereinafter described, and particularly pointed out in the claim.

My invention is illustrated in the annexed drawing, in which the figure is a side elevation, showing also the beam of the machine to which it is attached, and also one of the bearing-wheels.

A is the bearing-wheel of a combined harvester. B is one of the longitudinal beams thereof, the journal-bearings of the wheel A being secured to it.

C C are standards, whose lower ends are attached to the beam B. A sacker's platform (not shown) is also attached to the beam B at this point.

To the tops of standards C is attached a hopper, D, divided into three parts, for the purposes as will be shown.

Discharging into the hopper D is an inclined trough, F, which is flexibly suspended at its discharging end to a cross-beam, E', of the posts E, attached to the sides of the hopper by a hanger, $E^2$, and at its receiving end is likewise flexibly attached to the head of an elevator-trough, H, by the following device, viz: A hook, $G^2$, is attached to the elevator-trough H, and engages with a two-part hanger, G G', the part G' of which is bolted to the trough F. A pulley, I, located at the head of the elevator, is actuated from any initial point, and is connected with the trough F by a shaker-rod, J, imparting to the trough an end shake, being steadied and kept in position by a guide-rod, $H^2$, sliding back and forth in a guide, H', attached to the elevator-trough.

The trough F is provided with an upper sieve, F', which is of such mesh as to allow the kernels of grain and cheat to drop upon another sieve, $F^2$, beneath, while the refuse matter slides off the end of the sieve F' into the rear division of the hopper D. The cheat drops through the meshes of the sieve $F^2$, and slides down and off the bottom of the trough into the rear division of the hopper, while the kernels of grain slide down and off the end of the sieve $F^2$ into the middle division of the hopper D. Each division of the hopper is provided with suitable openings at the bottom and means for attaching a sack to receive the contents.

The grain is elevated by the elevator-trough H from a suitable point of the thrasher and discharged upon the upper sieve of the trough, and is cleaned on its passage down the trough which discharges into the three-part hopper, whence it is emptied into sacks, all as heretofore shown.

Having thus described my invention, what I claim as new, and desire to secure by Letters Patent, is—

The herein-described improvement in grain-separators, comprising the beam B, the standards C, the three-part hopper D, the posts E, the inclined trough F, containing sieves, the hanger $E^2$, the elevator H, the hook $G^2$, the hanger G G', the eye and guide-rod H' $H^2$, the crank-pulley I, and pitman J.

In testimony whereof I affix my signature in presence of two witnesses.

DAVID YOUNG.

Witnesses:
JOSHUA B. WEBSTER,
ELIHU B. STOWE.